United States Patent
Na et al.

(10) Patent No.: US 9,960,875 B2
(45) Date of Patent: May 1, 2018

(54) BASE STATION, COMMUNICATION SYSTEM AND METHOD THEREOF

(71) Applicant: NTT DoCoMo, Inc., Tokyo (JP)

(72) Inventors: Chongning Na, Beijing (CN); Xiaolin Hou, Beijing (CN); Atsushi Harada, Beijing (CN); Hidetoshi Kayama, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 286 days.

(21) Appl. No.: 14/682,602

(22) Filed: Apr. 9, 2015

(65) Prior Publication Data

US 2015/0295671 A1 Oct. 15, 2015

(30) Foreign Application Priority Data

Apr. 14, 2014 (CN) .......................... 2014 1 0147954

(51) Int. Cl.
| | |
|---|---|
| *H04J 3/12* | (2006.01) |
| *H04J 11/00* | (2006.01) |
| *H04B 7/04* | (2017.01) |
| *H04B 7/024* | (2017.01) |
| *H04B 7/06* | (2006.01) |
| *H04W 24/10* | (2009.01) |
| *H04B 7/0456* | (2017.01) |

(Continued)

(52) U.S. Cl.
CPC .......... *H04J 11/0053* (2013.01); *H04B 7/024* (2013.01); *H04B 7/0456* (2013.01); *H04B 7/0482* (2013.01); *H04B 7/0626* (2013.01); *H04B 7/0634* (2013.01); *H04L 25/0391* (2013.01); *H04L 25/03904* (2013.01); *H04W 24/10* (2013.01); *H04W 28/06* (2013.01); *H04W 28/16* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2010/0226293 A1* | 9/2010 | Kim ........................ | H04B 15/02 370/280 |
| 2010/0227613 A1* | 9/2010 | Kim .................. | H04L 25/03828 455/434 |

(Continued)

OTHER PUBLICATIONS

Communication pursuant to Article 94(3) EPC, European Patent Application No. 15 163 175.1, dated Jul. 14, 2016.

(Continued)

*Primary Examiner* — Kwang B Yao
*Assistant Examiner* — Juvena Loo
(74) *Attorney, Agent, or Firm* — Harness, Dickey & Pierce, P.L.C.

(57) ABSTRACT

The present disclosure provides a base station, a communication system and a method thereof. The communication system includes three base stations adjacent to each other, and each base station serves at least one UE. The method includes: acquiring, by each base station, a channel matrix of a channel from the base station to an adjacent base station; calculating an interference alignment-based transmission precoding matrix for each base station based on the channel matrices of the channels between the base stations; and precoding, by each base station, data to be transmitted with the interference alignment-based transmission precoding matrix.

10 Claims, 6 Drawing Sheets

(51) Int. Cl.
*H04L 25/03* (2006.01)
*H04W 28/06* (2009.01)
*H04W 28/16* (2009.01)
*H04W 92/20* (2009.01)

(56) References Cited

U.S. PATENT DOCUMENTS

| | | | | |
|---|---|---|---|---|
| 2010/0291945 | A1* | 11/2010 | Jang | H04W 72/082 455/452.2 |
| 2011/0065465 | A1* | 3/2011 | Kim | H04B 7/0404 455/502 |
| 2011/0177834 | A1* | 7/2011 | Shin | H04J 11/0033 455/501 |
| 2011/0182279 | A1* | 7/2011 | Ashikhmin | H04J 11/005 370/350 |
| 2011/0216817 | A1* | 9/2011 | Kim | H04B 7/0632 375/224 |
| 2012/0020319 | A1* | 1/2012 | Song | H04B 7/0632 370/330 |
| 2012/0157140 | A1* | 6/2012 | Kim | H04B 7/0634 455/501 |
| 2012/0281780 | A1* | 11/2012 | Huang | H04B 7/0452 375/267 |
| 2012/0302280 | A1* | 11/2012 | Seo | H04B 7/0417 455/522 |
| 2013/0058433 | A1* | 3/2013 | Na | H04L 25/03343 375/296 |
| 2013/0078991 | A1* | 3/2013 | Nam | H04B 7/024 455/423 |
| 2013/0170533 | A1* | 7/2013 | Khojastepour | H04B 7/024 375/227 |
| 2013/0258971 | A1* | 10/2013 | Lee | H04W 72/082 370/329 |
| 2013/0279422 | A1* | 10/2013 | Kim | H04W 24/02 370/328 |
| 2014/0348253 | A1* | 11/2014 | Mobasher | H04B 7/0452 375/267 |
| 2015/0131751 | A1* | 5/2015 | Bayesteh | H04B 7/0413 375/267 |
| 2015/0180561 | A1* | 6/2015 | Jindal | H04L 25/03898 375/267 |
| 2015/0358057 | A1* | 12/2015 | Lindqvist | H04B 7/024 370/329 |

OTHER PUBLICATIONS

Li, et al., "Transmission Strategies Selection for Cellular Networks", 2013 International Conference on Wireless Communications and Signal Processing. IEEE, Oct. 24, 2013, pp. 1-5.
Chen, et al., "Joint User Scheduling and Interference Alignment Beamforming in Heterogeneous Wireless Networks", 2014 IEEE 25th Annual International Symposium on Personal, Indoor, and Mobile Radio Communication (PIMRC), IEEE, Sep. 2, 2014, pp. 1083-1087.
Chae, et al., "Network Coordinated Beamforming for Cell-Boundary Users: Linear and Nonlinear Approaches", IEEE Journal of Selected Topics in Signal Processing, IEEE, US, vol. 3, No. 6, Dec. 1, 2009, pp. 1094-1105.
Extended European Search Report in corresponding application EP 15 16 3175, dated Aug. 20, 2015, 9 pages.

* cited by examiner

BASE STATION, COMMUNICATION SYSTEM AND METHOD THEREOF

CROSS-REFERENCE TO RELATED APPLICATION

This application claims priority to Chinese Patent Application No. 201410147954.5 filed on Apr. 14, 2014, the disclosures of which are incorporated in their entirety by reference herein.

TECHNICAL FIELD

The present disclosure relates to interference cancellation between base stations, in particular to an interference alignment-based transmission method for use in a dynamic time division duplex (TDD) system, a transmitter, and a communication system.

BACKGROUND

Dynamic TDD uplink/downlink (UL/DL) configuration is an effective scheme for meeting traffic adaptive requirements in a cellular system. However, in a dynamic TDD system, the individual TDD UL/DL configuration for each cell will result in a serious inter-cell interference.

Figure 1:
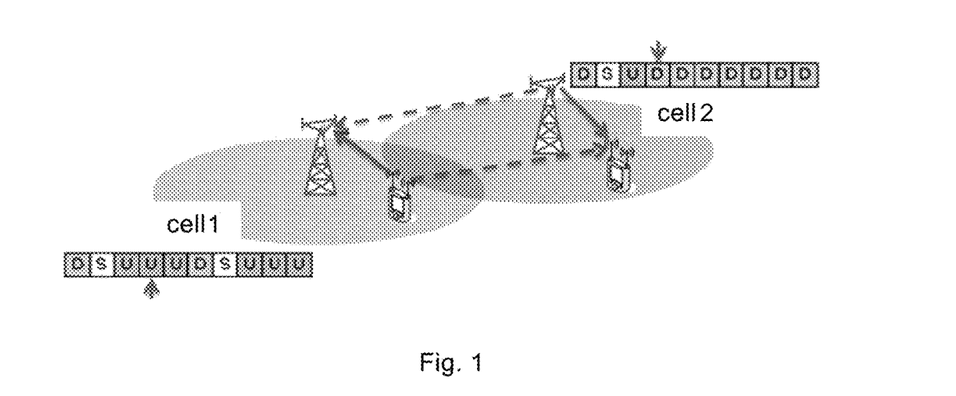
FIG. 1 is a schematic view showings the inter-cell interference in a TDD system.

Referring to FIG. 1, which is a schematic view showing the inter-cell interference in the dynamic TDD system, D represents a sub-frame for a downlink (DL), S represents a special sub-frame (which may be used for the downlink), and U represents a sub-frame for an uplink (UL). As shown in FIG. 1, downlink transmission of a base station in a cell 2 interferes with uplink reception of a base station in a cell 1, i.e., there is the inter-cell interference. In addition, uplink transmission of a UE (User Equipment) in the cell 1 interferes with downlink reception of a UE in the cell 2. The interference between the UEs may be canceled or reduced through uplink transmission power control, but uplink data will be extremely adversely affected by the interference between the base stations due to constant transmission power of the base stations and high channel quality therebetween. Simple interference cancellation schemes, e.g., using TDM or FDM, sacrifices available transmission opportunities for interference avoidance, and will inevitably result in a low spectral efficiency and a low system throughput.

SUMMARY

An objective of the present disclosure is to provide a communication system, a base station and a corresponding method, so as to provide a balance between interference cancellation and transmission efficiency in a better manner.

In one aspect, the present disclosure provides in one embodiment a method for use in a communication system. The communication system includes three base stations adjacent to each other, and each base station serves at least one UE. The method includes: acquiring, by each base station, a channel matrix of a channel from the base station to an adjacent base station; calculating an interference alignment-based transmission precoding matrix for each base station based on the channel matrices of the channels between the base stations; and precoding, by each base station, data to be transmitted with the interference alignment-based transmission precoding matrix.

In some embodiments, the method further includes: acquiring an instantaneous downlink channel matrix and instantaneous downlink channel quality information of a channel from each base station to the UE which the base station serves; multiplying the instantaneous downlink channel matrix by the interference alignment-based transmission precoding matrix, so as to obtain an equivalent channel matrix; optimizing based on the equivalent channel matrix and the instantaneous downlink channel quality information according to a predetermined optimization criterion, so as to obtain an optimized transmission precoding matrix; and precoding the data to be transmitted using the optimized transmission precoding matrix.

In some embodiments, the method further includes: calculating an interference alignment-based reception pre-decoding matrix for each base station based on the interference alignment-based precoding matrix of each base station and a channel matrix of a channel between the base station and the adjacent base station; and decoding a received uplink signal using the calculated interference alignment-based reception pre-decoding matrix.

In some embodiments, the method further includes: notifying, by each base station, the UE which the base station serves of the calculated interference alignment-based reception pre-decoding matrix, so as to enable the UE to calculate its transmission precoding matrix using the interference alignment-based reception pre-decoding matrix.

In some embodiments, each base station acquires channel state information of the channel between the base stations using a Sounding Reference Signal (SRS)-based uplink measurement method and channel reciprocity, so as to obtain the channel matrix.

In some embodiments, each base station acquires the channel state information of the channel between the base stations using a Cell-specific Reference Signal (CRS)- or Channel State Information-Reference Signal (CSI-RS)-based downlink measurement method and the channel reciprocity, so as to obtain the channel matrix.

In another aspect, the present disclosure provides in one embodiment a method for use in a communication system. The communication system includes three base stations adjacent to each other and a central device, and each base station serves at least one UE. The method includes: acquiring, by each base station, a channel matrix of a channel from the base station to an adjacent base station; transmitting, by each base station, the acquired channel matrix to the central device; calculating, by the central device, an interference alignment-based transmission precoding matrix for each base station based on the channel matrices of the channels between the base stations, and transmitting the calculated transmission precoding matrix to each base station; and precoding, by each base station, data to be transmitted using the calculated transmission precoding matrix.

In some embodiments, the method further includes: acquiring an instantaneous downlink channel matrix and instantaneous downlink channel quality information of a channel from each base station to the UE which the base station serves; multiplying, by each base station, the instantaneous downlink channel matrix by the interference alignment-based transmission precoding matrix acquired from the central device, so as to obtain an equivalent channel matrix; optimizing, by each base station, based on the equivalent channel matrix and the instantaneous downlink channel quality information according to a predetermined optimization criterion, so as to obtain an optimized transmission precoding matrix; and precoding the data to be transmitted using the optimized transmission precoding matrix.

In yet another aspect, the present disclosure provides in one embodiment a base station for use in a communication system. The communication system includes a plurality of base stations adjacent to each other, and each base station serves at least one UE. The base station includes: a channel matrix acquisition unit configured to acquire a channel matrix of a channel between the base stations; an interference alignment-based matrix calculation unit configured to calculate an interference alignment-based transmission precoding matrix for the base station based on the channel matrices of the channels between the base stations; and a transmission precoding unit configured to precode data to be transmitted using the calculated transmission precoding matrix.

In some embodiments, the base station further includes: an instantaneous channel state information acquisition unit configured to acquire instantaneous downlink channel state information of a channel from the base station to the UE which the base station serves, so as to obtain an instantaneous downlink channel matrix and instantaneous downlink channel quality information; and an optimized precoding matrix calculation unit configured to multiply the instantaneous downlink channel matrix by the interference alignment-based transmission precoding matrix so as to obtain an equivalent channel matrix, and optimize, based on the equivalent channel matrix and the instantaneous downlink channel quality information according to a predetermined optimization criterion so as to obtain an optimized transmission precoding matrix. The transmission precoding unit is further configured to precode the data to be transmitted using the optimized transmission precoding matrix.

In some embodiments, the interference alignment-based matrix calculation unit is configured to calculate an interference alignment-based reception pre-decoding matrix for the base station based on the interference alignment-based precoding matrix of the base station and the channel matrix of the channel between the base station and the adjacent base station, and decode a received uplink signal using the calculated interference alignment-based reception pre-decoding matrix.

In some embodiments, the channel matrix acquisition unit includes a backhaul unit configured to acquire a channel matrix of a channel between the base stations from the adjacent base station; and/or an inter-base-station channel measurement unit configured to measure a channel matrix of a channel from the adjacent base station to the base station, and acquire a channel matrix of the channel from the base station to the adjacent base station using channel reciprocity.

In some embodiments, the inter-base-station channel measurement unit is configured to acquire channel state information of the channel between the base stations using a Sounding Reference Signal (SRS)-based uplink measurement method and the channel reciprocity so as to obtain the channel matrix, or to acquire the channel state information of the channel between the base stations using a Cell-specific Reference Signal (CRS)- or Channel State Information-Reference Signal (CSI-RS)-based downlink measurement method and the channel reciprocity so as to obtain the channel matrix.

In still yet another aspect, the present disclosure provides in one embodiment a communication system, including three base stations adjacent to each other, and a central device. Each base station serves at least one UE, and it includes a channel matrix acquisition unit configured to acquire a channel matrix of a channel from the base station to an adjacent base station and transmit the acquired channel matrix to the central device. The central device is configured to calculate an interference alignment-based transmission precoding matrix for each base station based on channel matrices of the channels between the base stations, and transmit the calculated transmission precoding matrix to each base station. Each base station is configured to precode data to be transmitted using the calculated transmission precoding matrix.

In some embodiments, each base station further includes an instantaneous channel state information acquisition unit configured to acquire an instantaneous downlink channel matrix and instantaneous downlink channel quality information of a channel from the base station to the UE which the base station serves; an optimized precoding matrix calculation unit configured to multiply the instantaneous downlink channel matrix by the interference alignment-based transmission precoding matrix so as to obtain an equivalent channel matrix, and optimize, based on the equivalent channel matrix and the instantaneous downlink channel quality information according to a predetermined optimization criterion so as to obtain an optimized transmission precoding matrix; and a transmission precoding unit configured to precode the data to be transmitted using the optimized transmission precoding matrix.

In some embodiments, the channel matrix acquisition unit includes a backhaul unit configured to acquire a channel matrix of a channel from the base station to the adjacent base station; and/or an inter-base-station channel measurement unit configured to measure a channel matrix of a channel from the base station to the adjacent base station, and acquire a channel matrix of the channel from the base station to the adjacent base station using channel reciprocity.

According to the embodiments of the present disclosure, by using an interference alignment-based technique with a high spectral efficiency, it is able to provide a balance between the interference cancellation and the spectral efficiency in a better manner.

BRIEF DESCRIPTION OF THE DRAWINGS

The features and advantages of the present disclosure will be described in a more apparent manner in conjunction with the following drawings, in which.

DETAILED DESCRIPTION

The present disclosure will be described hereinafter in conjunction with the drawings and embodiments. It should be appreciated that, the following embodiments are for illustrative purposes only, but shall not be used to limit the scope of the present disclosure. In the following, a large number of specific details are provided so as to facilitate the understanding of the present disclosure. Obviously, it is unnecessary for a person skilled in the art to implement the present disclosure with these specific details. In some other embodiments, known circuits, materials or methods are not particularly defined so as not to cause confusion.

In the entire specification, such expressions as "one embodiment", "the embodiment", "one example" and "the example" mean that the specific features, structures or characteristics described in conjunction with the embodiment or example are included in at least one embodiment of the present disclosure, so these expressions do not always refer to the same embodiment or example. In addition, the specific features, structures or characteristics may be merged in one or more embodiments or examples in any suitable combinations and/or sub-combinations. Further, it should be appreciated that, such a term as "and/or" includes any and all combinations of one or more relevant items.

In order to overcome the drawbacks in the related art, the present disclosure provides in one embodiment a method for use in a communication system. The communication system includes three base stations adjacent to each other, and each base station serves at least one UE. The method includes: acquiring, by each base station, a channel matrix of a channel from the base station to the adjacent base station; calculating an interference alignment-based transmission precoding matrix for each base station based on the channel matrices of the channels between the base stations; and precoding, by each base station, data to be transmitted with its interference alignment-based transmission precoding matrix. As a result, by using an interference alignment-based technique with a high spectral efficiency, it is able to provide a balance between the interference cancellation and the spectral efficiency in a better manner. The present disclosure further provides in other embodiments the base station and the communication system for implementing the above method, and similarly, it is also able to provide the balance between the interference cancellation and the spectral efficiency in a better manner.

Figure 2:
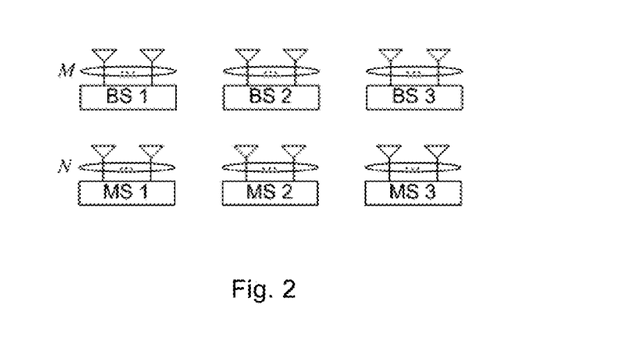
FIG. 2 is a schematic view showing a system according to one embodiment of the present disclosure.

Referring to FIG. 2, which is a schematic view showing the system according to one embodiment of the present disclosure, the system includes three base stations BS1, BS2 and BS3, and corresponding service objects, i.e., UEs MS1, MS2 and MS3. Each base station includes M antennae, each UE includes N antennae, and both M and N are greater than or equal to 2. In this dynamic TDD system, each base station may perform dynamic configuration for sub-frames in accordance with the uplink and downlink situations, so there is a very complex interference scenario in the system.

Figure 3:
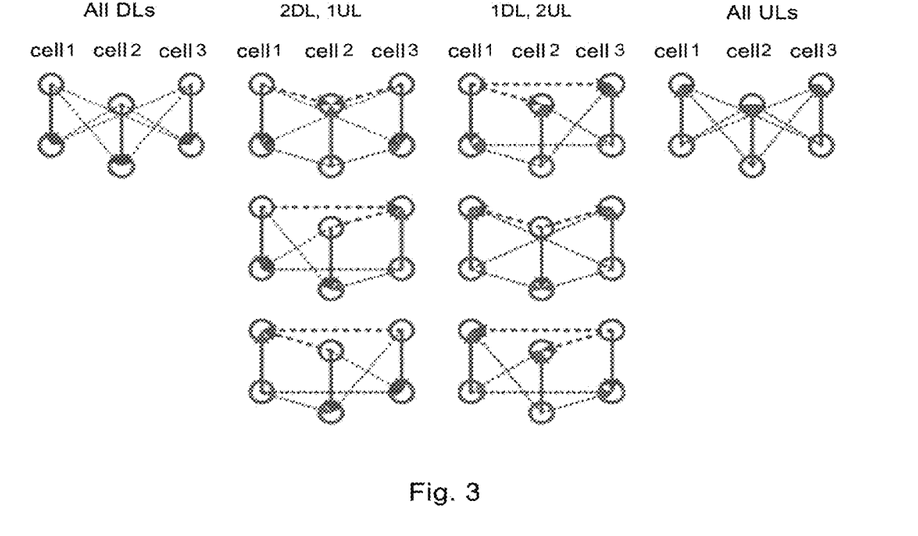
FIG. 3 is a schematic view showing different interference scenarios in the TDD system according to one embodiment of the present disclosure.

Referring to FIG. 3, which is a schematic view showing different interference scenarios in the TDD system according to one embodiment of the present disclosure, the base stations BS1, BS2 and BS3 correspond to a cell 1, a cell 2 and a cell 3, respectively. A first column in FIG. 3 shows an interference situation where merely downlinks are included, a second column shows the interference situation where two downlinks and one uplink are included, a third column shows an interference situation where one downlink and two uplinks are included, and a fourth column shows the interference situation where merely the uplinks are included. As shown in FIG. 3, the configuration for the sub-frames of different cells or BSs in the dynamic TDD system includes many possible combinations, so there is a complex inter-cell interference scenario. In this regard, the present disclosure provides a scheme for performing interference cancellation with respect to these different interference scenarios at the same time, e.g., by performing static or quasi-static configuration for an interference alignment-based matrix, so as to remarkably reduce the overhead.

Figure 4:
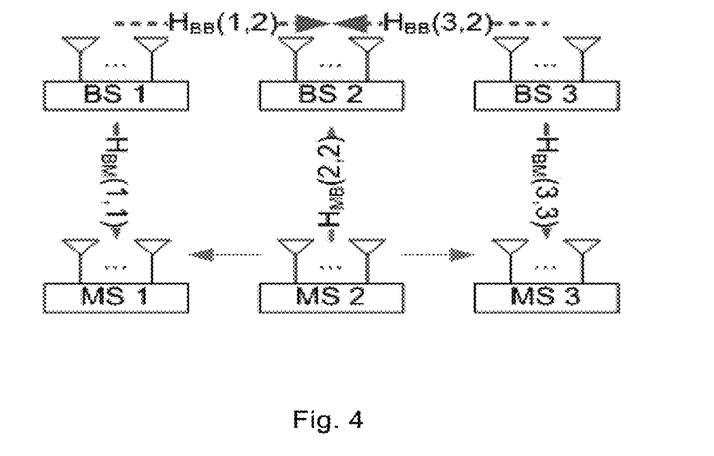
FIG. 4 is a schematic view showing a communication system according to one embodiment of the present disclosure.

Referring to FIG. 4, which is a schematic view showing a communication system according to one embodiment of the present disclosure, in the TDD system including three cells, the interference alignment and cancellation are performed at the base station BS2 on signals from the base station BS1 and the base station BS2. Because it is able to perform the control and optimization of the transmission power at a UE side, the following embodiments mainly relate to the inter-cell interference cancellation, with the interference between the UEs being omitted.

Figure 5:
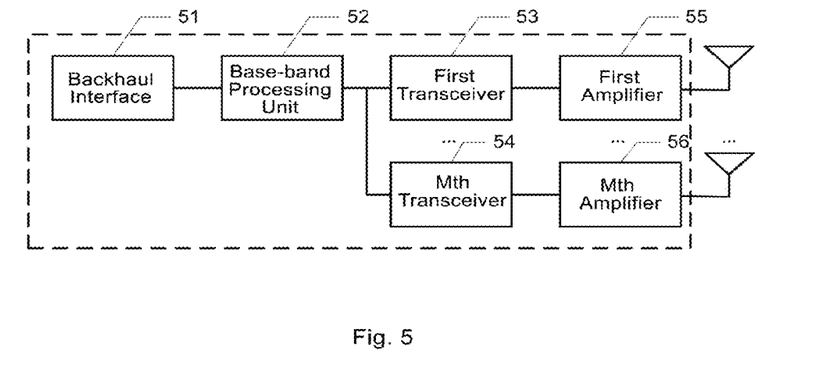
FIG. 5 is a schematic view showing a structure of a base station in the communication system according to one embodiment of the present disclosure.

Referring to FIG. 5, which is a schematic view showing a base station in the communication system according to one embodiment of the present disclosure, the base station includes a backhaul interface 51, a base-band processing unit 52, a first transceiver 53, an $M^{th}$ transceiver 54, a first amplifier 55 and an $M^{th}$ amplifier 56.

In the embodiment as shown in FIG. 5, the backhaul interface 51 is configured to receive a channel matrix of a channel between the base stations from an adjacent base station, and a transmission precoding matrix of the adjacent base station. The base-band processing unit 52 is configured to calculate interference alignment-based transmission precoding matrices and interference alignment-based reception precoding matrices for the base stations including a current base station based on the channel matrices of the channels between the base stations in the system. In the other embodiments, the base-band processing unit 52 is further configured to optimize the transmission precoding matrices based on instantaneous downlink channel state information, so as to increase a capacity of the system. For example, after acquiring an instantaneous downlink channel matrix of the channel from the base station to the UE which the base station serves and instantaneous downlink channel quality information, the base-band processing unit 52 is configured to multiply the instantaneous downlink channel matrix by the interference alignment-based transmission precoding matrix so as to obtain an equivalent transmission precoding matrix, optimize based on the equivalent channel matrix and the instantaneous downlink channel quality information according to a predetermined optimization criterion so as to obtain an optimized transmission precoding matrix, and precode data to be transmitted using the optimized transmission precoding matrix.

In some other embodiments, the base-band processing unit 52 is further configured to calculate an interference alignment-based reception pre-decoding matrix for each base station based on the interference alignment-based precoding matrix and a downlink channel matrix of each base station, and decode a received signal (e.g., a detected, received codeword) using the calculated interference alignment-based reception pre-decoding matrix.

In addition, the base-band processing unit 52 is further configured to precode (beam-form) the data or codeword to be transmitted using the obtained transmission precoding matrix, and then the data or codeword is transmitted by the corresponding transceivers 53, 54. In some embodiments, prior to the transmission, the signal is amplified by the amplifiers 55, 56 and then transmitted via the antenna.

Figure 6:
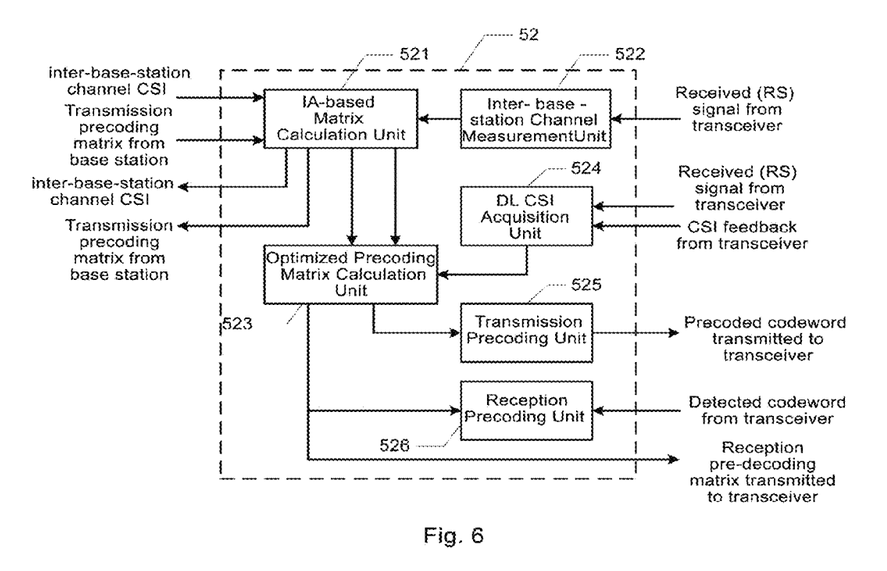
FIG. 6 is a schematic view showing a structure of a base-band processing unit in the base station as shown in FIG. 5.

Referring to FIG. 6, which is a schematic view showing the base-band processing unit 52 in the base station in FIG. 5, the base-band processing unit includes an interference alignment (IA)-based matrix calculation unit 521, an inter-base-station channel measurement unit 522, an optimized precoding matrix calculation unit 523, a downlink channel state information (DL CSI) acquisition unit 524, a transmission precoding unit 525 and a reception precoding unit 526.

By taking the base station BS1 as an example, the IA-based matrix calculation unit 521 is operated in such a way as to align at the base station BS1 the interferences from the base station BS2 and the base station BS3 to an identical sub-space in accordance with an interference alignment principle. This constraint may be realized by designing the IA-based precoding matrices of the base station BS2 and the base station BS3. To be specific, when a channel matrix of a channel from the base station BS2 to the base station BS1 is $H_{BB}(2,1)$, a channel matrix of a channel from the base station BS3 to the base station BS1 is $H_{BB}(3,1)$, an IA-based precoding matrix of the base station BS2 is $P_{IA}(2)$ and an IA-based precoding matrix of the base station BS3 is $P_{IA}(3)$, the above interference alignment relationship may be expressed by the following equation:

$$H_{BB}(2,1)P_{IA}(2)=\alpha_1 H_{BB}(3,1)P_{IA}(3) \quad (1).$$

This interference alignment principle also applies to the following situations where the interferences to the base station BS2 from the base station BS1 and the base station BS3 are aligned to the identical sub-space, and where the interferences to the base station BS3 from the base station BS1 and the base station BS2 are aligned to the identical sub-space.

Hence, the following equations may be obtained:

$$H_{BB}(3,2)P_{IA}(3)=\alpha_2 H_{BB}(1,2)P_A(1) \quad (2),$$

and $$H_{BB}(1,3)P_{IA}(1)=\alpha_3 H_{BB}(2,3)P_{IA}(2) \quad (3).$$

In these equations, $H_{BB}(3,2)$ represents a channel matrix of a channel from the base station BS3 to the base station BS2, $P_{IA}(3)$ represents an IA-based precoding matrix of the base station BS3, $H_{BB}(1,2)$ represents a channel matrix of a channel from the base station BS1 to the base station BS2, $P_{IA}(1)$ represents an IA-based precoding matrix of the base station BS1, $H_{BB}(1,3)$ represents a channel matrix of a channel from the base station BS1 to the base station BS3, $H_{BB}(2,3)$ represents a channel matrix of a channel from the base station BS2 to the base station BS3, $P_{IA}(2)$ represents an IA-based precoding matrix of the base station BS2, and $\alpha_1$, $\alpha_1$ and $\alpha_1$ are all coefficients.

The above equations (1) to (3) may be combined simultaneously so as to obtain the IA-based precoding matrix $P_{IA}(1)$ of the base station S1, the IA-based precoding matrix $P_{IA}(2)$ of the base station BS2, and the IA-based precoding matrix $P_{IA}(3)$ of the base station BS3, thereby to align the interferences to an identical direction at each base station. In this case, the interferences from different base stations may be canceled using, e.g., a zero-forcing method.

In addition, after a base station i acquires a precoding matrix of an adjacent base station j, it is able to know to which sub-space the interference from the adjacent base station is aligned. In this way, a pre-decoding matrix $G_{IA}(i)$ of the base station i may be calculated by the following equation:

$$G_{IA}(i)H_{BB}(j,i)P_{IA}(j)=0 \quad (4).$$

In this equation, $G_{IA}(i)$ represents the pre-decoding matrix of the base station i, $P_{IA}(i)$ represents an IA-based precoding matrix of the base station i, $H_{BB}(j,i)$ represents a channel matrix of a channel from the adjacent base station j to the base station i, i=1, 2 or 3, j=1, 2 or 3, and j≠i.

The inter-base-station channel measurement unit 522 is configured to acquire the inter-base-station channel matrices $H_{BB}(1,2)$, $H_{BB}(2,3)$, $H_{BB}(3,1)$, $H_{BB}(2,1)$, $H_{BB}(1,3)$ and $H_{BB}(3,2)$.

By taking the base station BS1 as an example, the base station BS1 may estimate the channel matrix $H_{BB}(2,1)$ of the channel from the base station BS2 to the base station BS1 in accordance with a reference signal (RS) from the base station BS2, and acquire the channel matrix $H_{BB}(1,2)$ of the channel from the base station BS1 to the base station BS2 in accordance with the channel reciprocity. Alternatively, the channel matrix $H_{BB}(1,2)$ of the channel from the base station BS1 to the base station BS2 may also be directly acquired by the IA-based matrix calculation unit 521 from the base station BS2 via a backhaul link. In addition, the inter-base-station channel estimation may be transmitted via an SRS (Sounding Reference Signal) and acquired on a UL (Uplink) channel estimation basis. The inter-base-station channel estimation may also be transmitted via a CRS (Cell-specific Reference signal) or CSI-RS (Channel State Information-Reference Signal) and acquired on a DL (Downlink) channel estimation basis.

The downlink channel state information (CSI) acquisition unit 524 is configured to acquire instantaneous downlink channel state information of a channel from the base station to the UE which the base station serves, so as to obtain the instantaneous downlink channel matrix and the channel quality information thereof. By taking the base station BS1 and the UE MS1 which BS1 serves as an example, the base station BS1 may estimate, in an accurate manner, the instantaneous downlink channel matrix $H_{BB}(1,1)$ of a channel from the base station BS1 to the UE MS1 as follows.

The UE MS1 estimates the instantaneous downlink channel state information of the channel from the base station BS1 to the UE MS1 based on the CRS or CSI-RS from the base station BS1, and after appropriate quantization and compression, the UE MS1 transmits the channel matrix $H_{BB}(1,1)$ to the base station BS1 via a feedback link.

The base station BS1 estimates instantaneous uplink channel information of a channel from the UE MS1 to the base station BS1 based on the SRS from the UE MS1, and acquires the instantaneous downlink channel matrix $H_{BB}(1,1)$ of a channel from the base station BS1 to the UE MS1 and corresponding channel quality information in accordance with the channel reciprocity.

The optimized precoding matrix calculation unit 523 may calculate a precoding mode suitable for the instantaneous downlink channel in accordance with the IA-based precoding matrix obtained from the IA-based matrix calculation unit 521 and the instantaneous downlink channel information acquired from the downlink CSI acquisition unit 524 about the channel from the base station to the UE which the base station serves. The optimization criterion may include maximizing a transmission throughput, maximizing a received SINR (signal to interference and noise ratio), maximizing a SLNR (signal to leakage and noise ratio), etc.

For example, the instantaneous downlink channel matrix obtained from the instantaneous downlink channel information is multiplied by the IA-based precoding matrix so as to obtain an equivalent downlink channel matrix, and the equivalent instantaneous downlink channel matrix is optimized with the instantaneous downlink channel quality information included in the instantaneous downlink channel information according to the optimization criterion so as to obtain the optimized precoding matrix.

The transmission precoding unit 525 is configured to precode downlink data to be transmitted in accordance with the optimized transmission precoding matrix acquired from the optimized precoding matrix calculation unit 523.

The reception precoding unit 526 is configured to pre-decode received uplink data using the reception pre-decoding matrix acquired from the IA-based precoding matrix calculation unit 521 or the optimized precoding matrix calculation unit 523.

Figure 7:
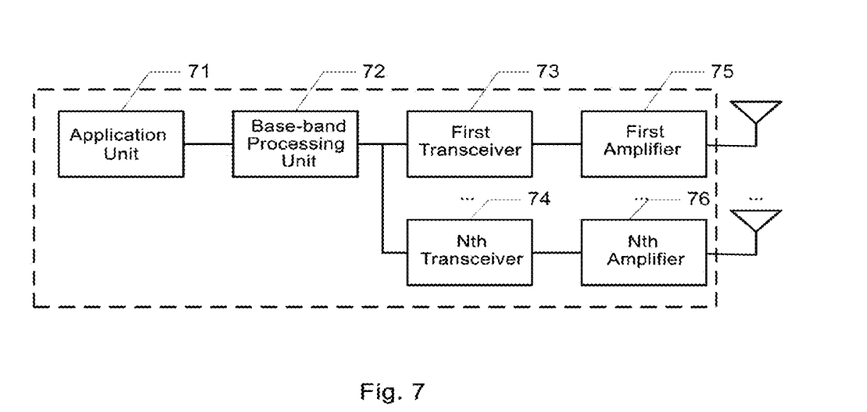
FIG. 7 is a schematic view showing a structure of a UE according to one embodiment of the present disclosure.

Referring to FIG. 7, which is a schematic view showing the UE according to one embodiment of the present disclosure, the UE in the communication system includes an application unit 71, a base-band processing unit 72, a first transceiver 73, an $N^{th}$ transceiver 74, a first amplifier 75 and an $N^{th}$ amplifier 76.

In one embodiment, the application unit 71 is configured to provide the data to be transmitted. The base-band processing unit 72 is configured to calculate a precoding matrix based on the reception pre-decoding matrix from the base station which serves the UE, and precode (beam-form) the data from the application unit 71. The coded data is then transmitted by the corresponding transceivers 73, 74. In some embodiments, prior to the transmission, the signal is amplified by the amplifiers 75, 76 and then transmitted via the antenna.

Figure 8:
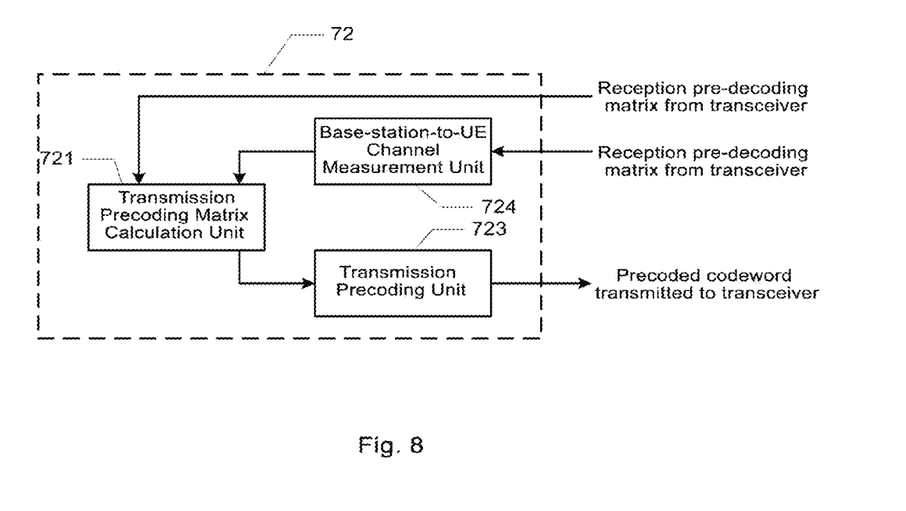
FIG. 8 is a schematic view showing a structure of a base-band processing unit in the UE as shown in FIG. 7.

FIG. 8 is a schematic view showing the base-band processing unit in the UE as shown in FIG. 7.

A base-station-to-UE channel measurement unit 724 in the UE may acquire a downlink channel from the base station to the UE using a downlink CRS or CSI-RS. The UE may acquire an uplink channel from the UE to the base station in accordance with the channel reciprocity.

A transmission precoding matrix calculation unit 721 may calculate an optimized uplink transmission precoding matrix using the uplink channel from the UE to the base station acquired from the base-station-to-UE channel measurement unit 724. Similarly, an optimization criterion may include maximizing a transmission throughput, maximizing a reception SINR, maximizing a SLNR, etc.

A transmission precoding unit 723 may precode uplink data and a demodulation reference signal to be transmitted using the transmission precoding matrix acquired from the transmission precoding matrix calculation unit 721.

Although the structures of the base station and the UE are described hereinabove in the form of modules, it should be appreciated that, the above modules may be provided in other forms, e.g., the backhaul interface and the inter-base-station channel measurement unit may be combined as a single module, i.e., a channel matrix acquisition module, so as to obtain the channel matrix of the channel between the base stations.

In addition, in the above embodiments, the precoding is performed after the optimization of the IA-based precoding matrix, so as to increase the system throughput. However, it should be appreciated that, this optimization is not necessarily desired.

Figure 9:
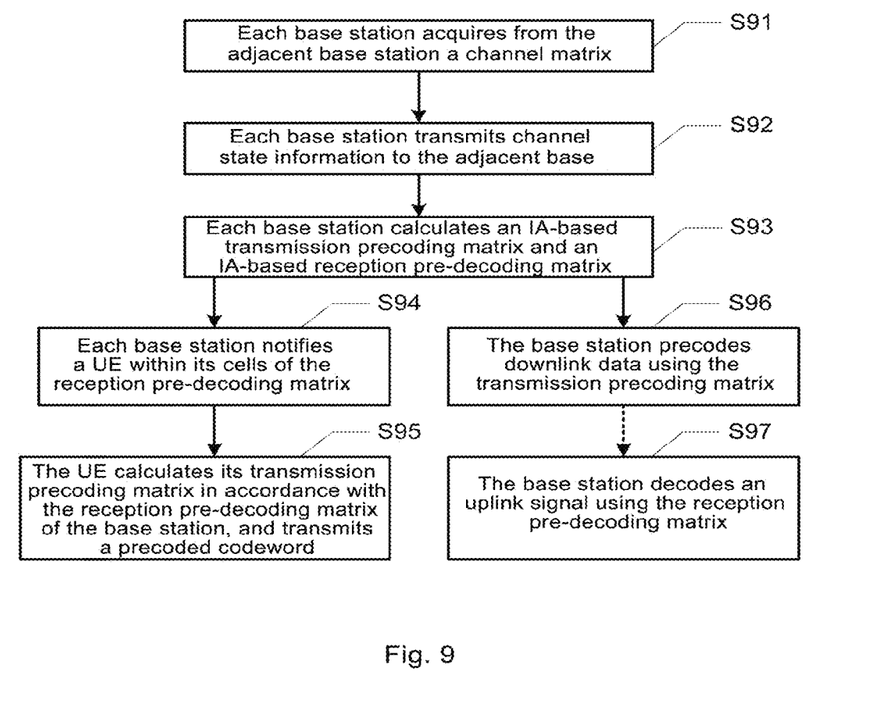
FIG. 9 is a flow chart of a method according to the one embodiment of the present disclosure.

Referring to FIG. 9, which is a flow chart of a method according to one embodiment of the present disclosure, at Step S91, each base station acquires from the adjacent base station a channel matrix of a channel from the adjacent base station to the base station, and at Step S92, each base station measures channel state information from the adjacent base station and transmits it to the adjacent base via a backhaul interface.

At Step S93, each base station calculates an IA-based transmission precoding matrix and an IA-based reception pre-decoding matrix. At Step S94, each base station notifies a UE within its cells of the IA-based pre-decoding matrix. At Step S95, the UE calculates its transmission precoding matrix in accordance with the reception pre-decoding matrix of the base station, precodes data to be transmitted, and transmits the coded data.

At Step S96, the base station further precodes downlink data using the transmission precoding matrix. Alternatively, at Step S97, the base station decodes an uplink signal (e.g., a detected, received codeword) using the reception pre-decoding matrix, so as to obtain the data from the UE.

In the other embodiments, the base station may further measure the instantaneous downlink channel state information, and optimize the transmission precoding matrix with the measured instantaneous downlink channel state information, so as to increase a system capacity.

Described above is a distributed method, i.e., the precoding/pre-decoding matrices are calculated at the respective base stations. In the other embodiments, a centralized method may also be adopted, e.g., each base station transmits the measured channel information to a cluster center (the central device), and then the cluster center calculates and optimizes the precoding/pre-decoding matrices.

Figure 10:
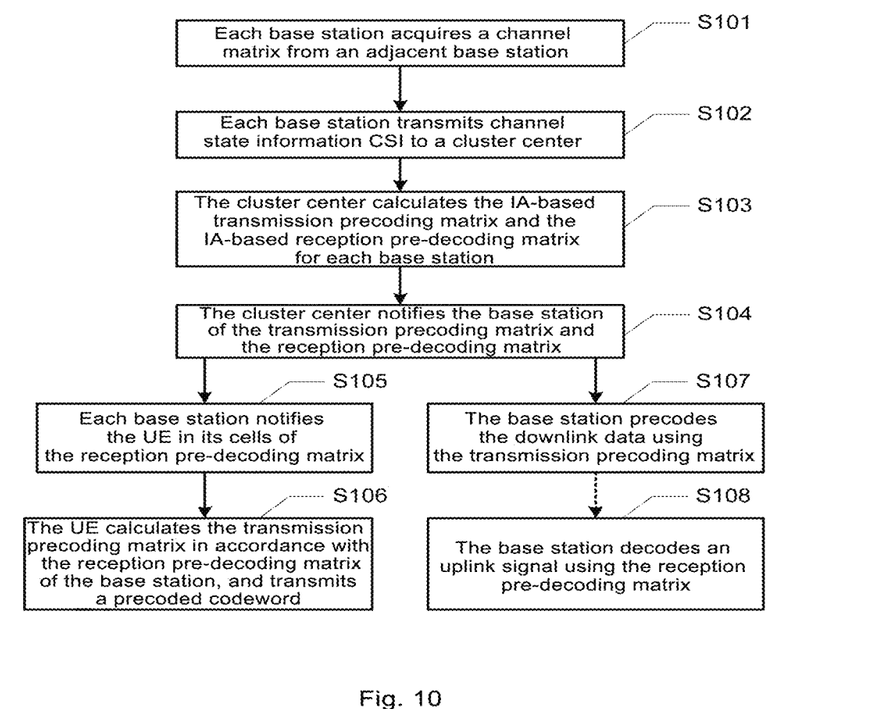
FIG. 10 is another flow chart of the method according to one embodiment of the present disclosure.

Referring to FIG. 10, which is another flow chart of the method according to one embodiment of the present disclosure, at Step S101, each base station acquires a channel matrix from an adjacent base station. At Step S102, each base station transmits the channel state information CSI to the cluster center. At Step S103, the cluster center calculates the IA-based transmission precoding matrix and the IA-based reception pre-decoding matrix for each base station. At Step S104, the cluster center transmits the calculated pre-coding and pre-decoding matrices to the corresponding base station.

At Step S105, each base station notifies the UE in its cells of the reception pre-decoding matrix. At Step S106, the UE calculates the transmission precoding matrix in accordance with the reception pre-decoding matrix of the base station, precodes the data to be transmitted, and transmits the coded data.

At Step S107, the base station further precodes the downlink data using the transmission precoding matrix. Alternatively, at Step S108, the base station decodes an uplink signal (e.g., a detected, received codeword) using the reception pre-decoding matrix, so as to obtain the data from the UE.

In the other embodiments, the base station may further measure the instantaneous downlink channel state information, and optimize based on the transmission precoding matrix and the measured instantaneous downlink channel state information, so as to increase a system capacity.

The embodiments of the base station, the communication system and the method thereof have been described hereinbefore using block diagrams, flow charts and/or examples. It should be appreciated that, in the case that the block diagrams, flow charts and/or examples include one or more functions and/or operations, each function and/or operation included in the block diagrams, flow charts and/or examples may be implemented individually, or collectively, through hardware, software, firmware or essentially the combinations thereof. In one embodiment, several parts of the subject matter of the present disclosure may be implemented by an application specific integrated circuit (ASIC), a field programmable gate array (FPGA), a digital signal processor (DSP) or any other integration device. However, it should also be appreciated that, some aspects of the embodiments of the present disclosure may be, completely or partially, implemented equivalently in an integrated circuit as one or more programs capable of being run on one or more computers (e.g., computer systems), as one or more programs capable of being run on one or more processors (e.g., microprocessors), as firmware, or essentially combinations thereof. According to the present disclosure, a person skilled in the art has the capability of designing the circuits and/or writing software and/or firmware codes. In addition, it should further be appreciated that, mechanisms of the subject matter of the present disclosure may be dispersed as program products in various forms, and regardless of the types of a signal-carrying medium actually used for the dispersion, the illustrative embodiments of the subject matter of the present disclosure are all applicable. The examples of the signal-carrying medium includes, but not limited to, a recording-type medium such as a soft disc, a hard disc drive, a compact disc (CD), a digital versatile disc (DVD), a digital tape and a computer memory; and a transmission-type medium such as a digital and/or analogue communication medium (e.g., an optical fiber/cable, a waveguide tube, a wired communication link and a wireless communication link).

Although the present disclosure is described hereinbefore with reference to some typical embodiments, it should be appreciated that, all the terms used above are for illustrative, rather than restrictive, purposes only. The present disclosure may be implemented in various embodiments without departing from the spirit or essence of the present disclosure, so the above embodiments are not limited to any details mentioned above, but shall be interpreted generally within the spirit and scope defined by the accompanying claims. Hence, all variations and modifications that fall within the scope of the claims or the equivalents thereof shall be included in the accompanying claims.

What is claimed is:

1. A method for use in a communication system, the communication system comprising three base stations adjacent to each other, each base station serving at least one user equipment (UE), the method comprising:
    acquiring, by each base station, a channel matrix of a channel from the base station to an adjacent base station;
    calculating an interference alignment-based transmission precoding matrix for each base station based on the channel matrices of the channels between the base stations; and
    precoding, by each base station, data to be transmitted with the interference alignment-based transmission precoding matrix,
    wherein the method further comprises:
    acquiring an instantaneous downlink channel matrix and instantaneous downlink channel quality information of a channel from each base station to the UE which the base station serves;
    multiplying the instantaneous downlink channel matrix by the interference alignment-based transmission precoding matrix, so as to obtain an equivalent channel matrix;
    optimizing based on the equivalent channel matrix and the instantaneous downlink channel quality information according to a predetermined optimization criterion, so as to obtain an optimized transmission precoding matrix; and
    precoding the data to be transmitted using the optimized transmission precoding matrix.

2. The method according to claim 1, further comprising:
    calculating an interference alignment-based reception pre-decoding matrix for each base station based on the interference alignment-based precoding matrix of each base station and a channel matrix of a channel between the base station and the adjacent base station; and
    decoding a received uplink signal using the calculated interference alignment-based reception pre-decoding matrix.

3. The method according to claim 2, further comprising:
    notifying, by each base station, the UE which the base station serves of the calculated interference alignment-based reception pre-decoding matrix, so as to enable the UE to calculate its transmission precoding matrix using the interference alignment-based reception pre-decoding matrix.

4. The method according to claim 1, wherein each base station acquires channel state information of the channel between the base stations using a Sounding Reference Signal (SRS)-based uplink measurement method and channel reciprocity, so as to obtain the channel matrix.

5. The method according to claim 1, wherein each base station acquires the channel state information of the channel between the base stations using a Cell-specific Reference Signal (CRS)-based downlink measurement method or a Channel State Information-Reference Signal (CSI-RS)-based downlink measurement method and the channel reciprocity, so as to obtain the channel matrix.

6. A method for use in a communication system, the communication system comprising three base stations adjacent to each other and a central device, each base station serving at least one UE, the method comprising:
    acquiring, by each base station, a channel matrix of a channel from the base station to an adjacent base station;
    transmitting, by each base station, the acquired channel matrix to the central device;
    calculating, by the central device, an interference alignment-based transmission precoding matrix for each base station based on the channel matrices of the channels between the base stations, and transmitting the calculated transmission precoding matrix to each base station; and
    precoding, by each base station, data to be transmitted using the calculated transmission precoding matrix,
    wherein the method further comprises:
    acquiring an instantaneous downlink channel matrix and instantaneous downlink channel quality information of a channel from each base station to the UE which the base station serves;
    multiplying, by each base station, the instantaneous downlink channel matrix by the interference alignment-based transmission precoding matrix acquired from the central device, so as to obtain an equivalent channel matrix;
    optimizing, by each base station, based on the equivalent channel matrix and the instantaneous downlink channel quality information according to a predetermined optimization criterion, so as to obtain an optimized transmission precoding matrix; and
    precoding the data to be transmitted using the optimized transmission precoding matrix.

7. A base station for use in a communication system, the communication system comprising a plurality of base stations adjacent to each other, each base station serving at least one UE, the base station comprising:
- a channel matrix acquisition unit configured to acquire a channel matrix of a channel between the base stations;
- an interference alignment-based matrix calculation unit configured to calculate an interference alignment-based transmission precoding matrix for the base station based on the channel matrices of the channels between the base stations; and
- a transmission precoding unit configured to precode data to be transmitted using the calculated transmission precoding matrix, wherein the base station further comprises:
- an instantaneous channel state information acquisition unit configured to acquire instantaneous downlink channel state information of a channel from the base station to the UE which the base station serves, so as to obtain an instantaneous downlink channel matrix and instantaneous downlink channel quality information; and
- an optimized precoding matrix calculation unit configured to multiply the instantaneous downlink channel matrix by the interference alignment-based transmission precoding matrix so as to obtain an equivalent channel matrix, and optimize based on the equivalent channel matrix and the instantaneous downlink channel quality information according to a predetermined optimization criterion so as to obtain an optimized transmission precoding matrix, wherein the transmission precoding unit is further configured to precode the data to be transmitted using the optimized transmission precoding matrix.

8. The base station according to claim 7, wherein the interference alignment-based matrix calculation unit is configured to calculate an interference alignment-based reception pre-decoding matrix for the base station based on the interference alignment-based precoding matrix of the base station and the channel matrix of the channel between the base station and the adjacent base station, and decode a received uplink signal using the calculated interference alignment-based reception pre-decoding matrix.

9. The base station according to claim 7, wherein the channel matrix acquisition unit comprises:
- a backhaul unit configured to acquire a channel matrix of a channel between the base stations from the adjacent base station; and/or
- an inter-base-station channel measurement unit configured to measure a channel matrix of a channel from the adjacent base station to the base station, and acquire a channel matrix of the channel from the base station to the adjacent base station using channel reciprocity.

10. The base station according to claim 9, wherein the inter-base-station channel measurement unit is configured to acquire channel state information of the channel between the base stations using a Sounding Reference Signal (SRS)-based uplink measurement method and the channel reciprocity so as to obtain the channel matrix, or to acquire the channel state information of the channel between the base stations using a Cell-specific Reference Signal (CRS)-based downlink measurement method or a Channel State Information-Reference Signal (CSI-RS)-based downlink measurement method and the channel reciprocity so as to obtain the channel matrix.

* * * * *